United States Patent
Yang et al.

(10) Patent No.: US 9,743,425 B2
(45) Date of Patent: Aug. 22, 2017

(54) METHODS AND APPARATUS FOR SCHEDULING ASSIGNMENT DESIGN FOR DEVICE TO DEVICE COMMUNICATIONS

(71) Applicant: Nokia Technologies Oy, Espoo (FI)

(72) Inventors: Weidong Yang, Hoffman Estates, IL (US); Juha S. Korhonen, Espoo (FI); Esa T. Tiirola, Kempele (FI); Cassio Barboza Ribeiro, Espoo (FI)

(73) Assignee: Nokia Technologies Oy, Espoo (FI)

( * ) Notice: Subject to any disclaimer, the term of this patent is extended or adjusted under 35 U.S.C. 154(b) by 126 days.

(21) Appl. No.: 14/731,867

(22) Filed: Jun. 5, 2015

(65) Prior Publication Data
US 2016/0360544 A1    Dec. 8, 2016

(51) Int. Cl.
*H04W 72/12* (2009.01)
*H04L 5/00* (2006.01)
*H04W 76/02* (2009.01)

(52) U.S. Cl.
CPC ........... *H04W 72/1278* (2013.01); *H04L 5/00* (2013.01); *H04W 76/023* (2013.01)

(58) Field of Classification Search
None
See application file for complete search history.

(56) References Cited

U.S. PATENT DOCUMENTS

| | | | | |
|---|---|---|---|---|
| 2014/0334372 A1* | 11/2014 | Vos | ............... | H04W 48/10 370/312 |
| 2015/0055582 A1* | 2/2015 | Park | ............... | H04W 72/042 370/329 |
| 2015/0071206 A1* | 3/2015 | Seo | ............... | H04L 5/0053 370/329 |
| 2015/0085818 A1* | 3/2015 | Huang | ............... | H04L 5/0037 370/330 |
| 2015/0334698 A1* | 11/2015 | Park | ............... | H04W 4/005 455/426.1 |
| 2015/0341775 A1 | 11/2015 | Tiirola et al. | | |
| 2016/0302174 A1* | 10/2016 | Chatterjee | ............ | H04B 7/0486 |
| 2016/0302223 A1* | 10/2016 | Song | ............... | H04W 72/1257 |

FOREIGN PATENT DOCUMENTS

WO    2015176758 A1    11/2015

OTHER PUBLICATIONS

"R1-144367, WF on SA Resource Transmission," 3GPP TSG-RAN WG1 #78bis, Ljubljana, Slovenia, Oct. 6-10, 2014.*
"Transmission pattern design to solve the half duplex problem", U.S. Appl. No. 62/056,528, Nokia Corporation, filed Sep. 26, 2014, 9 pgs.

(Continued)

*Primary Examiner* — Charles C Jiang
*Assistant Examiner* — Rose Clark
(74) *Attorney, Agent, or Firm* — Harrington & Smith

(57) ABSTRACT

Systems and techniques for resource allocation for scheduling assignment. A scheduling assignment is transmitted and/or received using resources that are divided into first and second scheduling assignment resources. A dual resource mapping in accordance with an scheduling assignment index is performed to define first and second resources for transmission and/or reception of the scheduling assignment.

21 Claims, 6 Drawing Sheets

(56) References Cited

OTHER PUBLICATIONS

"Discovery Signal Transmission for Proximity-Based Services Wireless Communications", Juha Sakari Korhonen et al., U.S. Appl. No. 62/056,458, filed Sep. 26, 2014, 53 pgs.
"Methods and Apparatus for Discovery Resource Signaling", Weidong Yang, et al., U.S. Appl. No. 62/013,243, filed Jun. 17, 2014, 41 pgs.
"R1-14xxxx, WF on SA Resource Transmission", Qualcomm Inc., 3GPP TSG RAN WG1 #78bis, Oct. 2014, 8 pgs.
"R1-143251, Pattern design and resource allocation signaling for discovery Type 2B", Nokia Networks, 3GPP TSG RAN WG1 Meeting #78, Aug. 2014, 12 pgs.
"R1-144166, Scheduling Assignment design for D2D communications", Nokia Networks, 3GPP TSG-RAN WG1 Meeting #79, Oct. 2014, 5 pgs.
"R1-144169, Discovery signal repetition", Nokia Corporation, 3GPP TSG-RAN WG1 Meeting #78bis, Oct. 2014, 7 pgs.
"R1-144337, Scheduling Assignment design for D2D communications", Nokia Networks, 3GPP TSG-RAN WG1 Meeting #79, Oct. 2014, 10 pgs.
"R1-144396, Scheduling Assignment design for D2D communications", Nokia Networks, 3GPP TSG-RAN WG1 Meeting #79, Oct. 2014, 14 pgs.

\* cited by examiner

|  | subframe 0 | subframe 1 | subframe 2 | subframe 3 | subframe 4 | subframe 5 | subframe 6 | subframe 7 |
|---|---|---|---|---|---|---|---|---|
| SA resource segment 1 | 0 | 1 | 2 | 3 | 4 | 5 | 6 | 7 |
|  | 8 | 9 | 10 | 11 | 12 | 13 | 14 | 15 |
|  | 16 | 17 | 18 | 19 | 20 | 21 | 22 | 23 |
|  | 24 | 25 | 26 | 27 | 28 | 29 | 30 | 31 |
| SA resource segment 2 | 32 | 33 | 34 | 35 | 36 | 37 | 38 | 39 |
|  | 40 | 41 | 42 | 43 | 44 | 45 | 46 | 47 |
|  | 48 | 49 | 50 | 51 | 52 | 53 | 54 | 55 |
|  | 56 | 57 | 58 | 59 | 60 | 61 | 62 | 63 |

202A (204A: segment 1; 204B: segment 2)

|  | subframe 0 | subframe 1 | subframe 2 | subframe 3 | subframe 4 | subframe 5 | subframe 6 | subframe 7 |
|---|---|---|---|---|---|---|---|---|
| SA resource segment 2 | 60 | 61 | 62 | 63 | 56 | 57 | 58 | 59 |
|  | 53 | 54 | 55 | 48 | 49 | 50 | 51 | 52 |
|  | 46 | 47 | 40 | 41 | 42 | 43 | 44 | 45 |
|  | 39 | 32 | 33 | 34 | 35 | 36 | 37 | 38 |
| SA resource segment 1 | 28 | 29 | 30 | 31 | 24 | 25 | 26 | 27 |
|  | 21 | 22 | 23 | 16 | 17 | 18 | 19 | 20 |
|  | 14 | 15 | 8 | 9 | 10 | 11 | 12 | 13 |
|  | 7 | 0 | 1 | 2 | 3 | 4 | 5 | 6 |

202B (204C: segment 2; 204D: segment 1)

| subframe 0 | subframe 1 | subframe 2 | subframe 3 | subframe 4 | subframe 5 | subframe 6 | subframe 7 | subframe 8 | subframe 9 | subframe 10 | subframe 11 |
|---|---|---|---|---|---|---|---|---|---|---|---|
| 0 | 1 | 2 | 3 | 4 | 5 | 6 | 7 | 8 | 9 | 10 | 11 |
| 12 | 13 | 14 | 15 | 16 | 17 | 18 | 19 | 20 | 21 | 22 | 23 |
| 24 | 25 | 26 | 27 | 28 | 29 | 30 | 31 | 32 | 33 | 34 | 35 |
| 36 | 37 | 38 | 39 | 40 | 41 | 42 | 43 | 44 | 45 | 46 | 47 |
| 48 | 49 | 50 | 51 | 52 | 53 | 54 | 55 | 56 | 57 | 58 | 59 |
| 60 | 61 | 62 | 63 |  |  |  |  |  |  |  |  |

302B

| subframe 0 | subframe 1 | subframe 2 | subframe 3 | subframe 4 | subframe 5 | subframe 6 | subframe 7 | subframe 8 | subframe 9 | subframe 10 | subframe 11 |
|---|---|---|---|---|---|---|---|---|---|---|---|
| 55 | 56 | 57 | 58 | 59 |  | 60 | 61 | 62 | 63 |  |  |
| 44 | 45 | 46 | 47 |  | 48 | 49 | 50 | 51 | 52 | 53 | 54 |
| 33 | 34 | 35 | 36 |  | 37 | 38 | 39 | 40 | 41 | 42 | 43 |
| 22 | 23 | 24 | 25 |  | 26 | 27 | 28 | 29 | 30 | 31 | 32 |
| 11 | 12 | 13 | 14 |  | 15 | 16 | 17 | 18 | 19 | 20 | 21 |
| 0 | 1 | 2 | 3 |  | 4 | 5 | 6 | 7 | 8 | 9 | 10 |

Fig. 3

METHODS AND APPARATUS FOR SCHEDULING ASSIGNMENT DESIGN FOR DEVICE TO DEVICE COMMUNICATIONS

TECHNICAL FIELD

The present invention relates generally to wireless communication. More particularly, the invention relates to improved systems and techniques for scheduling assignment design in device to device communications.

BACKGROUND

Device to device communication is becoming more and more widespread in wireless communication networks, and is a feature of increasing importance and interest in networks following 3GPP LTE and LTE-A specifications. An important aspect of such communication is the management of transmission scheduling among D2D UEs. Interest continues in developing scheduling assignment patterns that will insure efficiency in the use of resources and simplicity in construction of patterns.

SUMMARY

In an embodiment of the invention, a method comprises configuring allocation of scheduling assignment resources of a scheduling assignment resource pool. The scheduling assignment resource pool comprises $N_t$ subframes and $N_f$ logical parallel resources. The scheduling assignment resource pool is available for use by user devices operating in a cell of a wireless communications network. The method comprises, for a scheduling assignment resource index s of a plurality of scheduling assignment resource indices, configuring a first mapping defining a first scheduling assignment resource at a subframe index $n_{t_1}$ and a parallel resource index $n_{f_1}$ and a second scheduling assignment resource at a subframe index $n_{t_2}$ and a parallel resource index $n_{f_2}$. The first scheduling assignment resource is given by $n_{t_1} = \mathrm{mod}(s, N_t)$ and $n_{f_1} = \mathrm{floor}(s/N_t)$, and the second scheduling assignment resource is given by $n_{t_2} = \mathrm{mod}(s + \mathrm{mod}(\mathrm{floor}(s/N_t), N_t - 1) + 1, N_t)$ and $n_{f_2}$ is based on at least one of $N_f$ and $n_{f_1}$. The method further comprises transmitting or receiving a scheduling assignment using the physical resource blocks defined by the first and second scheduling assignment resources in accordance with the scheduling assignment resource index s.

In another embodiment of the invention, an apparatus configures allocation of scheduling assignment resources of a scheduling assignment resource pool. The scheduling assignment resource pool comprises $N_t$ subframes and $N_f$ logical parallel resources. The scheduling assignment resource pool is available for use by user devices operating in a cell of a wireless communications network. The apparatus comprises at least one processor and memory storing a program of instructions. The memory storing the program of instructions is configured to, with the at least one processor, cause the apparatus to at least, for a scheduling assignment resource index s of a plurality of scheduling assignment resource indices; configure a first mapping defining a first scheduling assignment resource at a subframe index $n_{t_1}$ and a parallel resource index $n_{f_1}$ and a second scheduling assignment resource at a subframe index $n_{t_2}$ and a parallel resource index $n_{f_2}$. The first scheduling assignment resource is given by $n_{t_1} = \mathrm{mod}(s, N_t)$ and $n_{f_1} = \mathrm{floor}(s/N_t)$, and the second scheduling assignment resource is given by $n_{t_2} = \mathrm{mod}(s + \mathrm{mod}(\mathrm{floor}(s/N_t), N_t - 1) + 1, N_t)$ and $n_{f_2}$ is based on at least one of $N_f$ and $n_{f_1}$. The apparatus is further caused to transmit or receive a scheduling assignment using the physical resource blocks defined by the first and second scheduling assignment resources in accordance with the scheduling assignment resource index s.

In another embodiment of the invention, a computer readable medium controls an apparatus to configure allocation of scheduling assignment resources of a scheduling assignment resource pool. The scheduling assignment resource pool comprises $N_t$ subframes and $N_f$ logical parallel resources. The scheduling assignment resource pool is available for use by user devices operating in a cell of a wireless communications network. The computer readable medium stores a program of instructions. Execution of the program of instructions by at least one processor configures the apparatus to at least, for a scheduling assignment resource index s of a plurality of scheduling assignment resource indices; configure a first mapping defining a first scheduling assignment resource at a subframe index $n_{t_1}$ and a parallel resource index $n_{f_1}$ and a second scheduling assignment resource at a subframe index $n_{t_2}$ and a parallel resource index $n_{f_2}$. The first scheduling assignment resource is given by $n_{t_1} = \mathrm{mod}(s, N_t)$ and $n_{f_1} = \mathrm{floor}(s/N_t)$, and the second scheduling assignment resource is given by $n_{t_2} = \mathrm{mod}(s + \mathrm{mod}(\mathrm{floor}(s/N_t), N_t - 1) + 1, N_t)$ and $n_{f_2}$ is based on at least one of $N_f$ and $n_{f_1}$. The apparatus is further caused to transmit or receive a scheduling assignment using the physical resource blocks defined by the first and second scheduling assignment resources in accordance with the scheduling assignment resource index s.

BRIEF DESCRIPTION OF THE DRAWINGS

FIG. 2 illustrates a scheduling assignment pattern design according to an embodiment of the present invention;

FIG. 3 illustrates a scheduling assignment pattern design according to an embodiment of the present invention;

DETAILED DESCRIPTION

Figure 1:
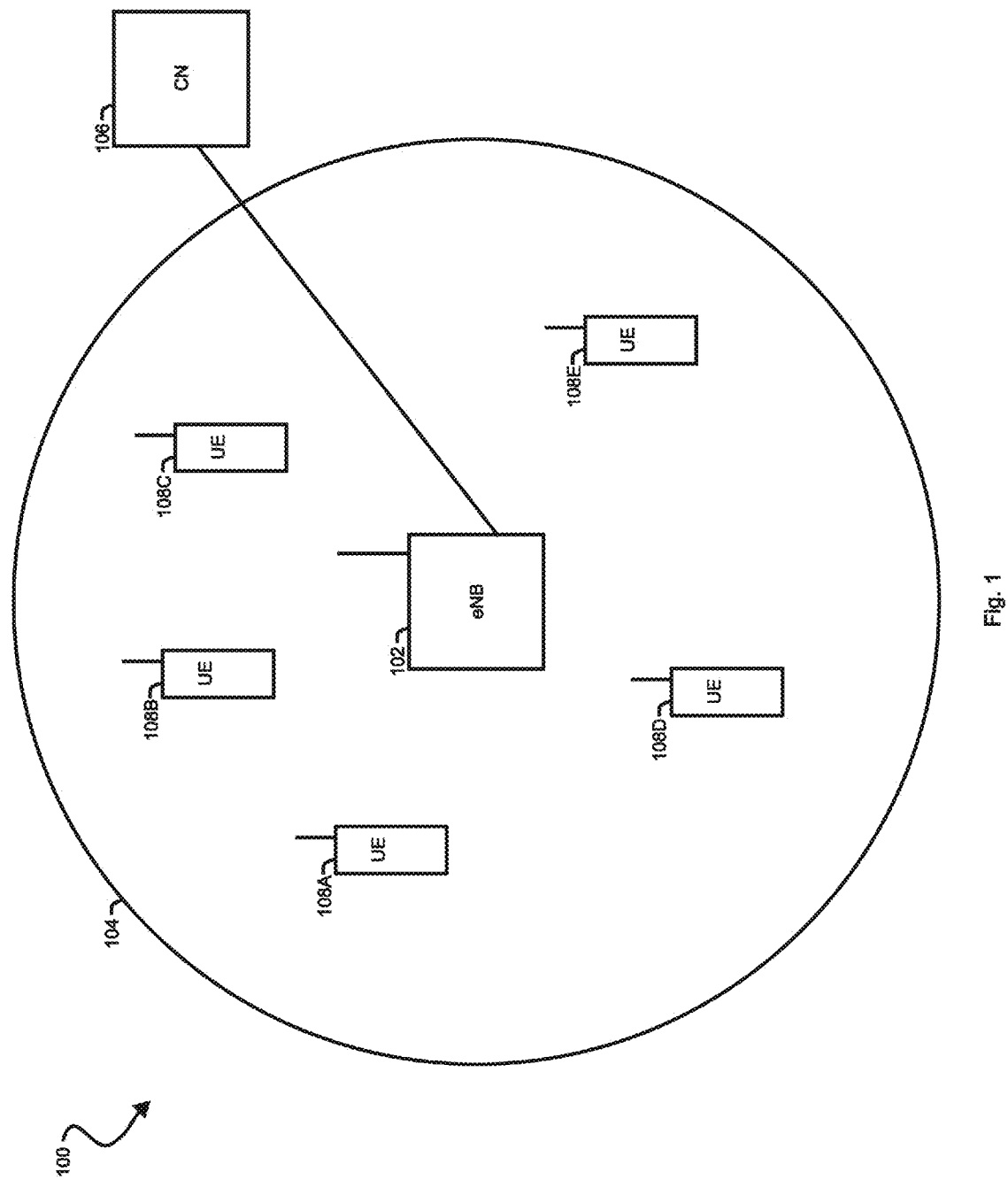
FIG. 1 illustrates a wireless network that may be configured to use embodiments of the present invention.

FIG. 1 illustrates a wireless network 100 comprising a base station, which may be implemented as an eNB 102, defining a cell 104. The eNB 102 may be connected to a core network 106, and may serve UEs 108A-108E. In the present example, the UEs 108A-108E may be D2D UEs. The network 100 suitably employs one or more scheduling assignment (SA) patterns designed so as to allow transmission one or more of the UEs 108A-108E while avoiding collision between transmissions.

Exemplary designs of SA patterns according to one or more embodiments of the invention are discussed below.

Embodiments of the present invention address various problems relating to generation of scheduling assignment (SA) transmission patterns in D2D communication, while accommodating design constraints imposed on SA transmission patterns.

D2D devices (UEs) operate in one of two modes: Mode 1, in which resource allocation for the UE is scheduled by the base station (eNB) serving the UE, and Mode 2, in which the UE autonomously selects resources for communication.

In Mode 1, the UE needs to be in the RRC_CONNECTED (radio resource control connected state.) The UE requests transmission resources from the eNB and the eNB schedules transmission resources for transmission of an SA or SAs, and for transmission of data. The UE sends a scheduling request to the eNB, followed by a buffer status report (BSs) message. Based on the BSR, the eNB can determine that the UE has data to transmit and estimates the resources needed for transmission, and schedules the specific resources to be used for SA transmission. The specific resource assigned by the eNB is within the resource pool provided to the LTE. One or more embodiments of the present invention provide mechanisms usable by the eNB to schedule SA transmission resources for a LIE.

In Mode 1, the downlink control indicator (DCI) fields have been established as follows:

| Bandwidth | 1.4 MHz | 20 MHz |
|---|---|---|
| Hopping flag | 1 | 1 |
| Data RB allocation | 5 | 13 |
| T-RPT index | 7 | 7 |
| SA resource index | 6 | 6 |
| TPC | 1 | 1 |
| Total: | 20 | 28 |

The SA resource index is an index into the SA resource pool and indicates both time and frequency dimensions. The TPC bit switches between maximum available power and open-loop power control, and the T-RPT index is 7 bits in both D2D Grant and SA for Mode 1 (and for Mode 2). The Mode 1 grant refers to the next instance of the SA resource pool that starts at least 4 ms after the subframe on which the Mode 1 grant is transmitted.

SA resource pool configuration parameters have been defined as follows:
Resource Size for SA is 1 PRB Pair.
In a given subframe, the maximum supported size of the combined SA resource pools (that is, the sum of the Mode 1 and Mode 2 SA resource pools) is 50.
No search space is defined within the SA resource pool.
Following are definitions for the transmission and reception resource pool for a cell, including SA, discovery, and Mode 2 data. The transmission and reception resource pool for SA, discovery, and Mode 2 data of a cell is indicated using the follow information elements and information element fields:
subframeBitmap:
  1 indicates subframe with D2D resources
  0 indicates subframe with no D2D resources
offsetIndicatorInitialization: Offset indicator used to determine the start of a resource pool
  The indicator is from SFN 0 between
    Serving cell or neighboring cells
    Only serving cell
  Granularity of 1 sub-frame
  RAN2 can choose to signal this parameter using 2 offsets
    The granularity of one of the two offsets does not need to be 1 subframe
prbLength: length of a D2D allocation in PRB
  Does not represent the total D2D allocation in a subframe
startPRB: D2D transmissions on a subframe can occur on PRB index greater than or equal to this value and less than startPRB+prbLength
endPRB: D2D transmissions on a subframe can occur on the PRB index lesser than or equal to this value and greater than endPRB−prbLength Subframe bitmap details:
  For FDD, subframeBitmap refers to contiguous set of uplink subframes.
  For TDD, subframeBitmap refers to contiguous uplink sub-frames of a TDD configuration
    TDD configurations that the UEs are to assume for the neighboring cells are signaled
  FDD: subframe bitmap length is 40
  TDD
    config 1-5: subframe bitmap length is twice the number of uplink sub-frames within a radio frame
    config 6: subframe bitmap length is 30
    config 0: subframe bitmap length is 42

SA transmissions have been defined so as to use two transmissions with redundancy version 0. The size of the SA resource index for Mode 1 transmission is 6 bits, and this constraint limits the number of available Mode 1 transmission patterns to 64.

The time resource pattern of transmission (T-RPT) has been defined as N=8 (where N is the for time division duplex (TDD) configuration 1, 2, 4, 5, with k={1,2,4,N} for Mode 1 and k={1,2,4} for Mode 2. The design considerations for N defined for T-RPT are applicable to SA as well, because SA transmission patterns face the same issues as data T-RPT for various TDD configurations. It is noted that N is the number of 1's in the subframeBitmap value defined for SA.

SA patterns are defined so that a single SA transmission always takes a single physical resource block (PRB) pair. Constraints facing SA pattern design include the fact that that the resources allocated to SA (6 bits) are limited, and the fact that resources for SA patterns can vary for a single configured prbLength value.

Suppose N is the number of 1s in an SA transmission pattern and k is the number of SA transmissions per SA message. In one example, N may be 8 and k is (according to the specified definition) 2, and in this case, the maximum number of UEs that can be accommodated with mutually hearable patterns is Comb(N=8, k=2)=28. If N=12, then from Comb(N=12, k=2)=66 patterns with mutual hearability, 64 transmission patterns can be chosen, corresponding to 6-bit SA resource index.

One or more embodiments of the invention provide for two-stage mapping for each scheduling assignment resource index S, in order to map transmissions indicated by the index to PRBs allocated for the transmissions. The first stage adapts the index to the need to accommodate half duplex transmission, and the second stage addresses fragmentation avoidance and frequency diversity.

Suppose there are $N_t$ subframes and $N_f$ logical parallel resources, and the $N_f$ logical parallel resources are divided into SA resource segments with each SA resource segment having $N_s$ parallel resources; and with SA resource segments being mapped into 2×prbLength PRB pairs.

Division of SA resources into SA resource segments is motivated by the following consideration: there are $(N_t^2)$ mutually bearable 2Tx patterns over $N_t$ subframes, and these consume $$\frac{\binom{N_t}{2} \times 2}{N_t} = N_t - 1$$

PRB pairs. The SA resource pool is defined by a segment expanding upward from a floor defined by startPRB and a segment expanding downward from a ceiling defined by endPRB. In such a case, $$2 \times \text{ceil}\left(\frac{N_t - 1}{2}\right)$$

PRB pairs are needed to map $$\binom{N_t}{2}$$

patterns into those two segments. It is thus possible to define SA resource segments as $$\text{ceil}\left(\frac{N_t - 1}{2}\right)$$

parallel resources.

Two modes—Mode 1 and Mode 2—have been defined for D2D transmission. In the case of Mode 1 transmission, if $N_t$ is small, $$\binom{N_t}{2} < 64,$$

then multiple SA resource segments can be used to obtain 64 patterns. In the case of Mode 2 transmission, even if $N_t$ is large, multiple SA resource segments may be needed to provide the required number of patterns.

Defining the SA resource pool as comprising SA resource segments ensures repetition of pattern arrangements in the SA resource pool, simplifying pattern selection.

It is also possible to define an SA resource segment as $N_1-1$ parallel resources (that is, $N_s=N_t-1$). In this case the pattern arrangement repeats in the SA resource pool for every $$2 \times \binom{N_t}{2} = N_t(N_t - 1)$$

patterns, and the first $$\frac{N_t(N_t - 1)}{2}$$

patterns are mutually hearable from one to another (with indices ranging from 0 to $$\frac{N_t(N_t - 1)}{2} - 1).$$

Similarly, the second $$\frac{N_t(N_t - 1)}{2}$$

patterns are mutually hearable from one to another (with indices from $$\frac{N_t(N_t - 1)}{2} \text{ to } N_t(N_t - 1) - 1).$$

One exemplary design can be defined as $N_s=N_t$. In this case the pattern arrangement repeats for $N_t^2$ patterns, and it is difficult to quantify the mutual hearability property for patterns within indices from $N_t(N_t-1)-1$ to $N_t^2-1$.

First Stage Mapping

At the first stage, the first transmission of an SA pattern, referred to by the ordered pair $(n_{t_1}, n_{f_1})$, representing the subframe index and parallel resource index for SA resource index s (counting from 0) is given by $$n_{t_1} = \text{mod}(s, N_t)$$

$$n_{f_1} = \text{floor}(s/N_t)$$

The second transmission $(n_{t_2}, n_{f_2})$ for SA resource index s is given by $$n_{t_2} = \text{mod}(s + \text{mod}(\text{floor}(s/N_t), N_s) + 1, N_t)$$

$$n_{f_2} = N_f - 1 - \text{floor}(s/N_t)$$

where $$N_s = \text{ceil}\left(\frac{N_t - 1}{2}\right)$$

or $N_s = N_t - 1$. $N_s$ is the size of an SA resource segment in PRB pairs.

The second transmission $(n_{t_2}, n_{f_2})$ can be also related to the first transmission $(n_{t_1}, n_{f_1})$ as follows:

$$n_{t_2} = \text{mod}(n_{t_1} + \text{mod}(n_{f_1}, N_s) + 1, N_t)$$

$$n = N_{f_1} - 1 - n_{f_1}$$

FIG. 2 illustrates a pattern configuration 200 with $N_t$ or N=8, and 32 patterns per SA resource segment. In this example, two segments are illustrated, with each of the two segments receiving two frequency blocks of four parallel resources. In an illustrated exemplary embodiment, the segments are segment 202A, with SA frequency blocks 204A and 204B; and segment 202B, with SA frequency blocks 204C and 204D. The presently illustrated segment 202A is mapped to the low and high frequency edges and the segment 202B is closer to the center frequency. In total, 64 patterns can be selected using a 6-bit index. It can be seen that the 2 transmissions associated with one SA resource index are placed close to the startPRB and to the endPRB respectively.

FIG. 3 illustrates a design 300 with N=12, providing 64 patterns. It can be seen that the two transmissions 302A and 302B associated with a single SA resource index are placed close to the top (startPRB) position and to the bottom (endPRB) position respectively, so that the maximum frequency diversity is achieved.

In mode 1 transmission, when the D2D traffic load is light, an eNB such as the eNB 102 can use an SA resource with a lower index or indices, so that the PRBs located farther away from startPRB and endPRB are not occupied or fragmented by SAs, and can be used for cellular uplink data transmission.

In general, SA plays two roles in D2D communications: one role is analogous to that of the physical downlink control channel (PDCCH), which provides resource assignment information and other information to receiving UEs; another role is similar to that of the physical random access channel (PRACH). Because Mode 2 D2D does not use a central node to coordinate D2D data transmissions, UEs need to contend for SA resources, and when the number of available SA transmission patterns is large, the collision probability becomes small. The collision probability on SA is also affected by the number of transmitting UEs.

To maintain a uniform level of collision probability in different environments in which different numbers of transmit UEs are present, one or more embodiments of the invention provide for variation in the number of transmission patterns. Parity between SA and the capacity for D2D data is desirable, because otherwise one or the other of these parameters is likely to create a bottleneck for D2D communications. Exemplary scenarios are presented below:

When the system bandwidth is small—for example 1.4 MHz—there are at most 6 PRBs in total for SA even if no PRBs are reserved for PUCCH, and insufficient resources are available for mapping all 64 transmission patterns. In such cases, not all 64 transmission patterns are necessarily needed because the D2D traffic load over 1.4 MHz will not be particularly high.

In other cases, even if the system bandwidth is large for example, 20 MHz, sufficient PRBs will be available for mapping all 64 transmission patterns. In addition, the D2D traffic load at any particular time may nevertheless be low, so that while all 64 transmission patterns are available, not all are needed.

Figure 4:
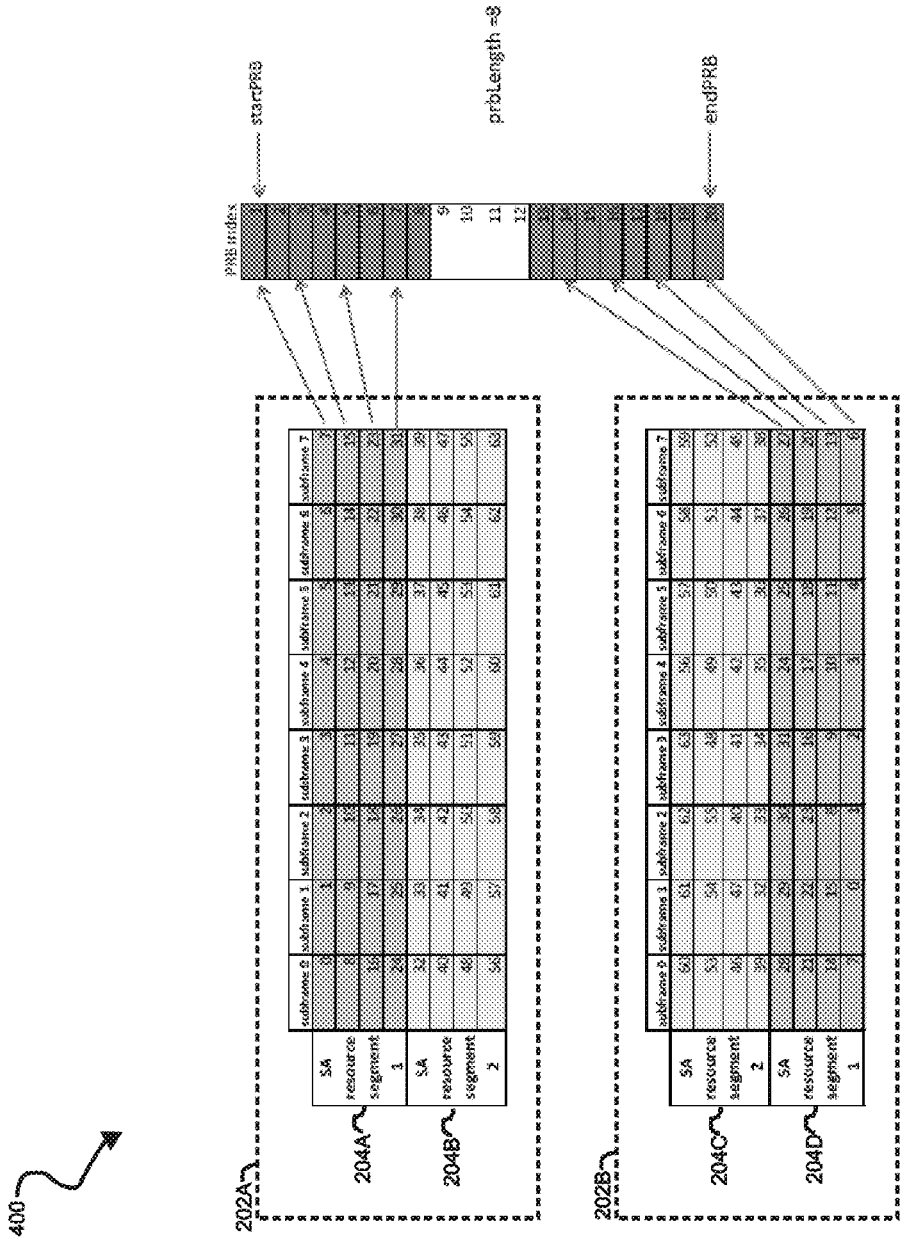
FIG. 4 illustrates a mapping between scheduling assignment patterns and physical resource blocks according to an embodiment of the present invention.

FIG. 4 illustrates a mapping 400 from the SA pattern index to PRBs, for the example for N=8 presented in FIG. 2 and discussed above, with the configurations 202A including the segments 204A and 204B, and the configuration 202B including the segments 204C and 204D. In the present example, only one SA resource segment is needed, and as noted above, differing numbers of SA patterns may be needed. In addition, the size of PRBLength may vary. Embodiments of the present invention provide for a mapping rule which can provide all resulting combinations.

Second Stage Mapping

For second stage mapping, embodiments of the present invention provide for two alternatives for mapping from parallel resources to 2×prbLength PRBs.

In a first alternative, $$I_1 = \text{floor}(n_{f_1} \times 2 \times \text{prbLength}/N_f) + N_{shift} + \text{startPRB}$$

$$I_2 = -\text{floor}((N_f - 1 - n_{f_2}) \times 2 \times \text{prbLength}/N_f) - N_{shift} + \text{endPRB},$$

where $I_1$ and $I_2$ are the PRB indices to which transmissions at $n_{f_1}$ and $n_{f_2}$ are mapped.

In the example above, prbLength=8, $N_f$=8, $N_{shift}$=0. It can be seen that only 32 patterns are available in the example due to the limit imposed by prbLength.

Therefore, one or more embodiments of the invention provide for a value that may be called $N_{shift}$ to be used to offset the PRBs used by SAs in adjacent cells, so that that frequency reuse provided by the pattern can be exploited to mitigate interference. For example, $N_{shift}$=1 can be used in an adjacent cell. It can be noted that the mapping is defined by three parameters in addition to startPRB and endPRB:SA parallel resource size $N_f$, prbLength, and $N_{shift}$.

In an additional alternative according to an embodiment of the present invention, $$I_1 = n_{f_1} N_{step} + N_{shift} + \text{startPRB}$$

$$I_2 = -(N_f - 1 - n_{f_2}) N_{step} - N_{shift} + \text{endPRB}$$

If a SA resource index would cause transmissions on PRBs to extend beyond startPRB+prbLength−1 or to fall below end PRB−prbLength+1, then that SA resource index is not eligible for use by any UE. In this way, the physical limitation imposed by (for example) the limitations of a low bandwith (for example, 1.4 MHz) will be automatically addressed, and a unified treatment will naturally be achieved.

In a second alternative, the design can be realized by combining the first and second stages. The final design for the first alternative can be similarly derived:

For SA resource index s, the first transmission's time and PRB index are given by $$\begin{cases} n_{t_1} = \text{mod}(s, N_t) \\ I_1 = \text{floor}(s/N_t) N_{step} + N_{shift} + \text{startPRB} \end{cases}$$

The second transmission's time and PRB index are given by $$\begin{cases} n_{t_2} = \text{mod}(s + \text{mod}(\text{floor}(s/N_t), N_s) + 1, N_t) \\ I_2 = -\text{floor}(s/N_t) N_{step} - N_{shift} + \text{endPRB} \end{cases}$$

where $$N_s = \text{ceil}\left(\frac{N_t - 1}{2}\right)$$

or $N_s = N_t - 1$.

The following mapping is adopted for the mapping between SA resource index and time/frequency for two transmissions:

For SA resource index s, the first transmission's time and PRB index are given by $$\begin{cases} n_{t_1} = \text{mod}(s, N_t) \\ I_1 = \text{floor}(s/N_t) N_{step} + N_{shift} + \text{startPRB} \end{cases}$$

The second transmission's time and PRB index are given by $$\begin{cases} n_{t_2} = \text{mod}(s + \text{mod}(\text{floor}(s/N_t), N_s) + 1, N_t) \\ I_2 = -\text{floor}(s/N_t) N_{step} - N_{shift} + \text{endPRB} \end{cases}$$

where $$N_s = \text{ceil}\left(\frac{N_t - 1}{2}\right)$$

or, alternatively, $N_s = N_t - 1$.

Figure 5:
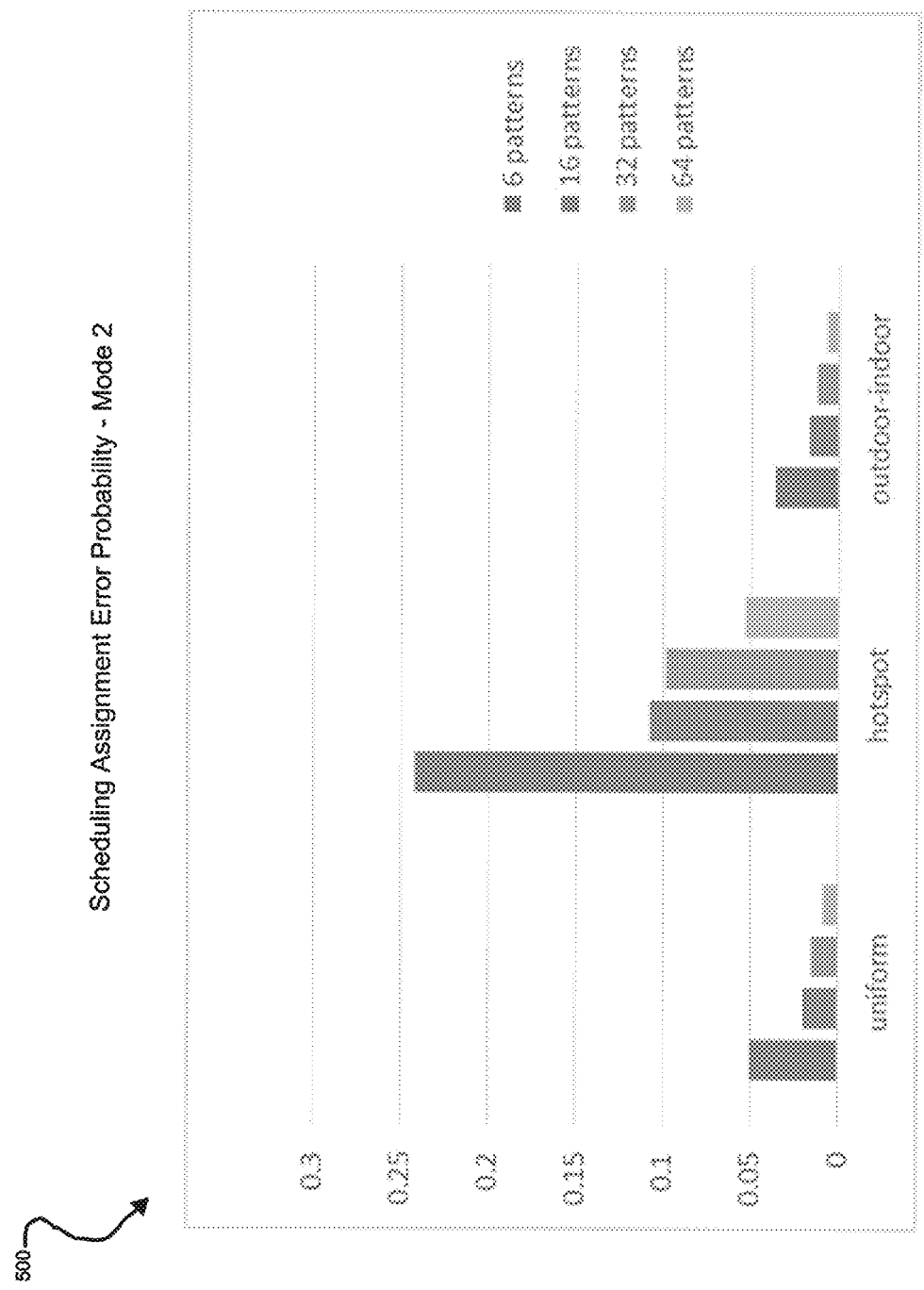

FIG. 5 illustrates a presentation 500 of simulation results for a number of alternative scheduling assignment configurations yielding 6, 16, 32, and 64 patterns, respectively. The configurations yielding 32 and 64 patterns are achieved using one or more embodiments of the present invention. The simulation results show error probabilities for each configuration in different uses uniform distribution of devices, a use in which one device is used as an hotspot, and a configuration in which devices are distributed so that some are in indoor locations and others are in outdoor locations.

The configuration exhibiting the lowest error probability is the 64-pattern configuration, and the configuration exhibiting the highest error probability is the 6-pattern configuration. Given that same simulation setup is used for the four configurations that have been simulated, with each design yielding a similar number of patterns, the inherent pattern property leads to the performance difference. As one can see the performance changes from one configuration to another closely correlate to that of the number of mutually hearable patterns.

For the 4-pattern configuration, N equals to 4 and consequently the largest number of mutually bearable patterns is 6, so that the SA error probability is close to 25% for (for example) the hotspot scenario. For the 16 and 32-pattern configurations, the SA error probability is also high compared to the 64-pattern configuration. In order to achieve a low SA error probability, N should be chosen to insure that the number of mutually hearable patterns is sufficient to insure a desired SA error performance.

It will be recognized, then, that: The mapping between SA resource index and physical resources needs to be flexible in terms of system bandwidth, the number of SA patterns, and the resources available for SA. It will be further recognized that N should be chosen to insure that the greatest number of mutually hearable patterns yielded by the configuration being used is adequate to ensure SA error performance.

In one or more embodiments of the invention, therefore, the following mapping is used for the mapping between SA resource index and time/frequency for 2 transmissions:

For SA resource index s, the first transmission's time and frequency are given by $$\begin{cases} n_{t_1} = \mod(s, N_t) \\ l_1 = \text{floor}(s/N_t)N_{step} + N_{shift} + startPRB \end{cases}$$

the second transmission's time and frequency are given by $$\begin{cases} n_{t_2} = \mod(s + \mod(\text{floor}(s/N_t), N_s) + 1, N_t) \\ l_2 = -\text{floor}(s/N_t)N_{step} - N_{shift} + endPRB \end{cases}$$

where $$N_s = \text{ceil}\left(\frac{N_t - 1}{2}\right)$$

or $N_s = N_t - 1$.

Figure 6:
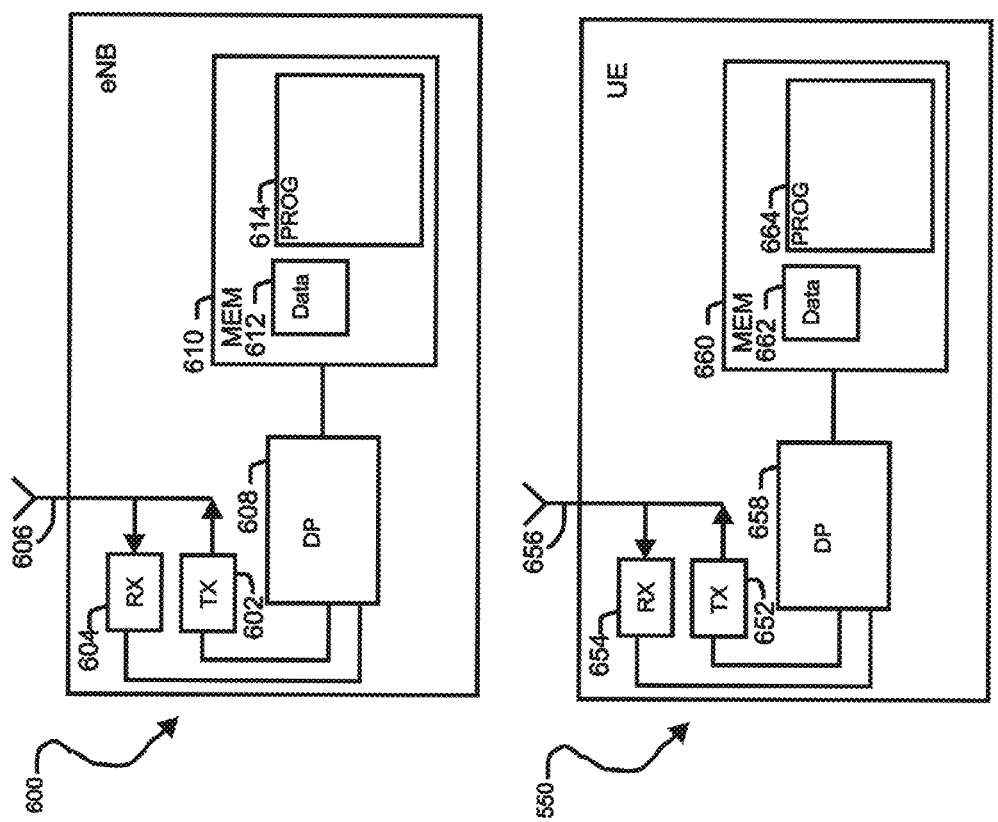
FIG. 6 illustrates hardware elements that can be used to carry out one or more embodiments of the present invention.

FIG. 6 illustrates details of an=(eNB) 600 and a user equipment (UE) 650. The eNB 600 may suitably comprise a transmitter 602, receiver 604, and antenna 606. The eNB 600 may also include a data processor (DP) 608 and memory (MEM) 610. The eNB 600 may employ data 612 and programs (PROGS) 614, residing in memory 610.

The UE 650 may suitably comprise a transmitter 652, receiver 654, and antenna 656. The UE 650 may also include a data processor (DP) 658 and memory (MEM) 660. The UE 650 may employ data 662 and programs (PROGS) 664, residing in memory 660.

At least one of the PROGs 614 in the eNB 600 is assumed to include a set of program instructions that, when executed by the associated DP 608, enable the device to operate in accordance with the exemplary embodiments of this invention, as detailed above. In these regards the exemplary embodiments of this invention may be implemented at least in part by computer software stored on the MEM 610, which is executable by the DP 608 of the eNB 600, or by hardware, or by a combination of tangibly stored software and hardware (and tangibly stored firmware). Similarly, at least one of the PROGs 664 in the UE 650 is assumed to include a set of program instructions that, when executed by the associated DP 658, enable the device to operate in accordance with the exemplary embodiments of this invention, as detailed above. In these regards the exemplary embodiments of this invention may be implemented at least in part by computer software stored on the MEM 660, which is executable by the DP 658 of the UE 650, or by hardware, or by a combination of tangibly stored software and hardware (and tangibly stored firmware). Electronic devices implementing these aspects of the invention need not be the entire devices as depicted at FIG. 1 or FIG. 6 or may be one or more components of same such as the above described tangibly stored software, hardware, firmware and DP, or a system on a chip SOC or an application specific integrated circuit ASIC.

In general, the various embodiments of the UE 650 can include, but are not limited to personal portable digital devices having wireless communication capabilities, including but not limited to cellular telephones, navigation devices, laptop/palmtop/tablet computers, digital cameras and music devices, and Internet appliances.

Various embodiments of the computer readable MEM 610 and 660 include any data storage technology type which is suitable to the local technical environment, including but not limited to semiconductor based memory devices, magnetic memory devices and systems, optical memory devices and systems, fixed memory, removable memory, disc memory, flash memory, DRAM, SRAM, EEPROM and the like. Various embodiments of the DP 608 and 658 include but are not limited to general purpose computers, special purpose computers, microprocessors, digital signal processors (DSPs) and multi-core processors.

We claim:

1. A method:
for at least one scheduling assignment resource index s of a plurality of scheduling assignment resource indices identifying resources belonging to a scheduling assignment resource pool comprising $N_t$ subframes and $N_f$ logical parallel resources, wherein the scheduling assignment resource pool is available for use by user devices operating in a cell of a wireless communications network:
configuring a first mapping defining a first scheduling assignment resource at a subframe index $n_{t_1}$ and a parallel resource index $n_{f_1}$ wherein the first scheduling assignment is given by $n_{t_1} = \mod(s, N_t)$ and $n_{f_1} = \text{floor}(s/N_t)$; and
configuring a second mapping defining a second scheduling assignment resource at a subframe index $n_{t_2}$ and a parallel resource index $n_{f_2}$ is given by $n_{f_2}=\mathrm{mod}(\mathrm{floor}(s/N_t), N_t-1)+1, N_t)$ and $n_{f_2}$ is based on at least one of $N_f$ and $n_{f_1}$; and transmitting or receiving a scheduling assignment using physical resource blocks defined by the first and second scheduling assignment resources in accordance with the at least one scheduling assignment resource index s.

2. The method of claim 1, wherein $n_{f_2}$ is based on both $N_f$ and $n_{f_1}$.

3. The method of claim 1, wherein the scheduling assignment is a scheduling assignment for a device-to-device communication.

4. The method of claim 1, further comprising a second stage mapping defining physical resource block indices $I_1$ and $I_2$, to which transmissions at $n_{f_1}$ and $n_{f_2}$, respectively, are mapped, wherein $I_1 = \mathrm{floor}(n_{f_1} \times 2 \times \mathrm{prbLength}/N_f) + N_{shift} + \mathrm{startPRB}$ and $I_2 = -\mathrm{floor}((N_f-1-n_{f_2}) \times 2 \times \mathrm{prbLength}/N_f) - N_{shift} + \mathrm{endPRB},$ and wherein $N_{shift}$ is an offset taking into account the physical resource blocks used for scheduling assignments in adjacent cell, prbLength is a length of a allocation in units of physical resource blocks and start PRB and endPRB are indexes of physical resource blocks indicative of a range of physical resource blocks in which transmissions may occur.

5. The method of claim 1, further comprising a second stage mapping defining physical resource block indices $I_1$ and $I_2$, to which transmissions at $n_{f_1}$ and $n_{f_2}$, respectively, are mapped, wherein $I_1 = n_{f_1} N_{step} + N_{shift} + \mathrm{startPRB},$ $I_2 = -(N_f-1-n_{f_2}) N_{step} - N_{shift} + \mathrm{endPRB},$ wherein $N_{step}$ is a spacing between physical resource blocks in a mapping pattern, and wherein $N_{shift}$ is an offset taking into account the physical resource blocks used for scheduling assignments in one or more adjacent cells and start PRB and endPRB are indexes of physical resource blocks indicative of a range of physical resource blocks in which transmissions may occur.

6. The method of claim 5, wherein, for scheduling assignment resource s, the time and frequency for the first transmission are given by $$\begin{cases} n_{t_1} = \mathrm{mod}(s, N_t) \\ I_1 = \mathrm{floor}(s/N_t) N_{step} + N_{shift} + \mathrm{startPRB} \end{cases}$$

and the time and frequency for the second transmission are given by $$\begin{cases} n_{t_2} = \mathrm{mod}(s + \mathrm{mod}(\mathrm{floor}(s/N_t), N_t-1)+1, N_t) \\ I_2 = -\mathrm{floor}(s/N_t) N_{step} - N_{shift} + \mathrm{endPRB} \end{cases}$$

7. The method of claim 5, further comprising excluding from use any scheduling assignment physical resource block index allowing for transmission on physical resource blocks extending beyond startPRB+prbLength−1 or falling below endPRB−prbLength+1, where prbLength is a length of an allocation in units of physical resource blocks.

8. An apparatus comprising:
at least one processor; and
memory storing a program of instructions;

wherein the memory storing the program of instructions is configured to, with the at least one processor, configure the apparatus to at least:

for at least one scheduling assignment resource index s of a plurality of scheduling assignment resource indices identifying resources belonging to a scheduling assignment resource pool comprising $N_t$ subframes and $N_f$ logical parallel resources, wherein the scheduling assignment resource pool is available for use by user devices operating in a cell of a wireless communications network:

configure a first mapping defining a first scheduling assignment resource at a subframe index $n_{t_1}$ and a parallel resource index n wherein the first scheduling assignment is given by $n_{t_1}=\mathrm{mod}(s,N_t)$ and $n_{f_1}=\mathrm{floor}(s/N_t)$; and configure a second mapping defining a second scheduling assignment resource at a subframe index $n_{t_2}$ and a parallel resource index $n_{f_2}$ is given by $n_{f_2}=\mathrm{mod}(s+\mathrm{mod}(\mathrm{floor}(s/N_t), N_t-1)+1, N_t)$ and $n_{f_2}$ is based on at least one of $N_f$ and $n_{f_1}$; and transmit or receive a scheduling assignment using physical resource blocks defined by the first and second scheduling assignment resources in accordance with the at least one scheduling assignment resource index s.

9. The apparatus of claim 8, wherein $n_{f_2}$ is based on both $N_f$ and $n_{f_1}$.

10. The apparatus of claim 8, wherein the scheduling assignment is a scheduling assignment for a device-to-device communication.

11. The apparatus of claim 8, wherein the apparatus is further caused to perform a second stage mapping defining physical resource block indices $I_1$ and $I_2$, to which transmissions at $n_{f_1}$ and $n_{f_2}$, respectively, are mapped, wherein $I_1 = \mathrm{floor}(n_{f_1} \times 2 \times \mathrm{prbLength}/N_f) + N_{shift} + \mathrm{startPRB}$ and $I_2 = -\mathrm{floor}((N_f-1-n_{f_2}) \times 2 \times \mathrm{prbLength}/N_f) - N_{shift} + \mathrm{endPRB},$ and wherein $N_{shift}$ is an offset taking into account the physical resource blocks used for scheduling assignments in adjacent cell, prbLength is a length of a allocation in units of physical resource blocks and start PRB and endPRB are indexes of physical resource blocks indicative of a range of physical resource blocks in which transmissions may occur.

12. The apparatus of claim 8, wherein the apparatus is further caused to perform a second stage mapping defining physical resource block indices $I_1$ and $I_2$, to which transmissions at $n_{f_1}$ and $n_{f_2}$, respectively, are mapped, wherein $I_1 = n_{f_1} N_{step} + N_{shift} + \mathrm{startPRB},$ $I_2 = -(N_f-1-n_{f_2}) N_{step} - N_{shift} + \mathrm{endPRB},$ wherein $N_{step}$ is a spacing between physical resource blocks in a mapping pattern, and wherein $N_{shift}$ is an offset taking into account the physical resource blocks used for scheduling assignments in one or more adjacent cells and start PRB and endPRB are indexes of physical resource blocks indicative of a range of physical resource blocks in which transmissions may occur.

13. The apparatus of claim 12, wherein, for scheduling assignment resource s, the time and frequency for the first transmission are given by and the time and frequency for the second transmission are given by $$\begin{cases} n_{t_2} = \mathrm{mod}(s + \mathrm{mod}(\mathrm{floor}(s/N_t), N_1 - 1) + 1, N_t) \\ I_2 = -\mathrm{floor}\,(s/N_t)N_{step} - N_{shift} + endPRB \end{cases}.$$

14. The apparatus of claim 12, wherein the apparatus is further caused to exclude from use any scheduling assignment physical resource block index allowing for transmission on physical resource blocks extending beyond startPRB+prbLength−1 or falling below endPRB−prbLength+1, where prbLength is a length of an allocation in units of physical resource blocks.

15. A non-transitory computer readable medium storing a program of instructions, execution of which by at least one processor configures the apparatus to at least:
for at least one scheduling assignment resource index s of a plurality of scheduling assignment resource indices identifying resources belonging to a scheduling assignment resource pool comprising Nt subframes and Nf logical parallel resources,
wherein the scheduling assignment resource pool is available for use by user devices operating in a cell of a wireless communications network:
configure a first mapping defining a first scheduling assignment resource at a subframe index $n_{t1}$ and a parallel resource index $n_{f1}$ wherein the first scheduling assignment is given by $n_{t1}=\mathrm{mod}(s,N_t)$ and $n_{f1}=\mathrm{floor}(s/N_t)$; and configure a second mapping defining a second scheduling assignment resource at a subframe index $n_{t2}$, and a parallel resource index $n_{f1}$ is given by $n_{t2}=\mathrm{mod}(s+\mathrm{mod}(\mathrm{floor}(s/N_t),N_t-1)+1,N_t)$ and $n_{f2}$ is based on at least one of Nf and $n_{f1}$; and
transmitting or receiving a scheduling assignment using physical resource blocks defined by the first and second scheduling assignment resources in accordance with the at least one scheduling assignment resource index s.

16. The non-transitory computer readable medium of claim 15, wherein $n_{f2}$ is based both $N_f$ and $n_{f1}$.

17. The non-transitory computer readable medium of claim 15, wherein the scheduling assignment is a scheduling assignment for a device-to-device communication.

18. The non-transitory computer readable medium of claim 15, wherein the apparatus is further caused to perform a second stage mapping defining resource block indices $I_1$, and $I_2$, to which transmissions at $n_{f1}$ and $n_{f2}$, respectively, are mapped, wherein $I_1=\mathrm{floor}(n_{f1}\times 2\times \mathrm{prbLength}/N_f)+N_{shift}+\mathrm{startPRB}$ and $I_2=-\mathrm{floor}((N_f-1-n_{f2})\times 2\times \mathrm{prbLength}/N_f)-N_{shift}+\mathrm{endPRB}$, and wherein $N_{shift}$, is an offset taking into account the physical resource blocks used for scheduling assignments in adjacent cell, prbLength is a length of a allocation in units of physical resource blocks and start PRB and endPRB are indexes of physical resource blocks indicative of a range of physical resource blocks in which transmissions may occur.

19. The non-transitory computer readable medium of claim 15, wherein the apparatus is further configured to perform a second stage mapping defining physical resource block indices $I_1$ and $I_2$, to which transmissions at $n_{f1}$ and $n_{f2}$, respectively, are mapped, wherein $I_1=n_{f1}N_{step}+N_{shift}+\mathrm{startPRB}$, $I_2=-(N_f-1-n_{f2})N_{step}-N_{shift}+\mathrm{endPRB}$, wherein $N_{step}$ is a spacing between physical resource blocks in a mapping pattern, and
wherein $N_{shift}$ is an offset taking into account the physical resource blocks used for scheduling assignments in one or more adjacent cells and start PRB and endPRB are indexes of physical resource blocks indicative of a range of physical resource blocks in which transmissions may occur.

20. The non-transitory computer readable medium of claim 19, wherein, for scheduling assignment resource s, the time and frequency for the first transmission are given by $$\begin{cases} n_{t_1} = \mathrm{mod}(s, N_t) \\ I_1 = \mathrm{floor}(s/N_t)N_{step} + N_{shift} + startPRB \end{cases}$$

and the time and frequency for the second transmission are given by $$\begin{cases} n_{t_2} = \mathrm{mod}(s + \mathrm{mod}(\mathrm{floor}(s/N_t), N_t - 1) + 1, N_t) \\ I_2 = -\mathrm{floor}\,(s/N_t)N_{step} - N_{shift} + endPRB \end{cases}$$

21. The non-transitory computer readable medium of claim 19, wherein the apparatus is further configured to exclude from use any scheduling assignment physical resource block index allowing for transmission on physical resource blocks extending beyond startPRB+prbLength−1 or falling below endPRB−prbLength+1 where prbLength is a length of a allocation in units of physical resource blocks.

* * * * *

UNITED STATES PATENT AND TRADEMARK OFFICE
CERTIFICATE OF CORRECTION

PATENT NO. : 9,743,425 B2
APPLICATION NO. : 14/731867
DATED : August 22, 2017
INVENTOR(S) : Weidong Yang et al.

It is certified that error appears in the above-identified patent and that said Letters Patent is hereby corrected as shown below:

In the Claims

<u>In Claim 8</u>:
Column 12, Line 14, "index n" should be deleted and -- index $n_{f_1}$ -- should be inserted.

<u>In Claim 15</u>:
Column 13, Line 40, "index $n_{f_1}$" should be deleted and -- index $n_{f_2}$ -- should be inserted.

<u>In Claim 15</u>:
Column 13, Line 44, "Nf" should be deleted and -- $N_f$ -- should be inserted.

<u>In Claim 16</u>:
Column 13, Line 50, "both $N_f$" should be deleted and -- both on $N_f$ -- should be inserted.

Signed and Sealed this
Third Day of October, 2017

Joseph Matal
*Performing the Functions and Duties of the*
*Under Secretary of Commerce for Intellectual Property and*
*Director of the United States Patent and Trademark Office*